United States Patent
Michiels

(10) Patent No.: US 10,701,558 B2
(45) Date of Patent: Jun. 30, 2020

(54) SYSTEM AND METHOD FOR SECURING A WI-FI NETWORK

(71) Applicant: Rosemount Aerospace Inc., Burnsville, MN (US)

(72) Inventor: Steve P. Michiels, Rockford, IL (US)

(73) Assignee: Rosemount Aerospace Inc., Burnsville, MN (US)

(*) Notice: Subject to any disclaimer, the term of this patent is extended or adjusted under 35 U.S.C. 154(b) by 207 days.

(21) Appl. No.: 15/949,751

(22) Filed: Apr. 10, 2018

(65) Prior Publication Data

US 2019/0313251 A1    Oct. 10, 2019

(51) Int. Cl.
| | |
|---|---|
| H04L 29/06 | (2006.01) |
| H04W 12/06 | (2009.01) |
| H04W 12/04 | (2009.01) |
| H04B 3/54 | (2006.01) |

(52) U.S. Cl.
CPC .............. *H04W 12/06* (2013.01); *H04B 3/54* (2013.01); *H04W 12/04* (2013.01); *H04B 3/548* (2013.01); *H04B 2203/547* (2013.01)

(58) Field of Classification Search
CPC ........ H04W 12/06; H04W 12/04; H04B 3/54; H04B 3/548; H04B 2203/547
See application file for complete search history.

(56) References Cited

U.S. PATENT DOCUMENTS

| | | | | |
|---|---|---|---|---|
| 6,587,037 B1* | 7/2003 | Besser | ................... | E21B 43/128 340/538.11 |
| 9,124,580 B1 | 9/2015 | Sampigethaya | | |
| 9,623,983 B2 | 4/2017 | Kumar et al. | | |
| 2008/0191851 A1* | 8/2008 | Koga | ..................... | H04B 3/542 340/12.32 |
| 2010/0146277 A1* | 6/2010 | Mochizuki | .............. | H04L 9/083 713/169 |
| 2011/0173447 A1* | 7/2011 | Zhang | .................... | H04B 3/542 713/168 |
| 2012/0119701 A1* | 5/2012 | Igata | ........................ | H02J 7/02 320/109 |
| 2014/0173271 A1* | 6/2014 | Dadu | .................... | H04B 3/542 713/153 |
| 2014/0181279 A1* | 6/2014 | Louis | .................... | H04W 12/02 709/222 |

(Continued)

OTHER PUBLICATIONS

Extended European Search Report for EP Application No. 19168165.9, dated Jul. 15, 2019, pp. 9.

*Primary Examiner* — Ghodrat Jamshidi

(74) *Attorney, Agent, or Firm* — Kinney & Lange, P.A.

(57) ABSTRACT

A system for securing a Wi-Fi network includes a power source that transmits an electric current along at least one power line, a power line communication (PLC) module in electrical communication with the power source via the at least one power line with the PLC module being configured to modulate the electric current to include a power line communication that contains a Wi-Fi network authentication key, and a control module in electrical communication with and downstream from the PLC module via the at least one power line with the control module being configured to extract the power line communication from the electric current and utilize the Wi-Fi network authentication key to access the Wi-Fi network.

19 Claims, 2 Drawing Sheets

(56) References Cited

U.S. PATENT DOCUMENTS

| | | | | |
|---|---|---|---|---|
| 2015/0146799 A1* | 5/2015 | Liu | ................ | H04B 3/54 |
| | | | | 375/257 |
| 2015/0188739 A1* | 7/2015 | Igarashi | ................ | H04B 3/46 |
| | | | | 375/257 |
| 2015/0237036 A1* | 8/2015 | Ng | ................ | H04L 63/08 |
| | | | | 726/6 |
| 2016/0203310 A1* | 7/2016 | Laifenfeld | ................ | G06F 21/44 |
| | | | | 726/6 |
| 2016/0227632 A1* | 8/2016 | Zhang | ................ | H05B 45/10 |

* cited by examiner

SYSTEM AND METHOD FOR SECURING A WI-FI NETWORK

FIELD OF THE INVENTION

The present invention relates to securing wireless communication between components and, in particular, utilizing a power line communication to transmit a Wi-Fi network authentication key to secure a Wi-Fi network that is used for communication between components in a system.

BACKGROUND

Communication between components in a system, such as between a master control and various mechanisms (e.g., sensors, actuators, valves, etc.), is generally performed via communication wires that extend between the components. Such wires are heavy, take up precious space, are time consuming to install, and are prone to damage that can cause interference to the communication. While systems that use wireless communication reduce the need to use communication wires, these systems are prone to cyber-attacks and thus their use is avoided within certain systems, such as communication systems on sensitive vehicles (e.g., aircraft and military vehicles) or automated assembly lines.

SUMMARY

A system for securing a Wi-Fi network includes a power source that transmits an electric current along at least one power line, a power line communication (PLC) module in electrical communication with the power source via the at least one power line with the PLC module being configured to modulate the electric current to include a power line communication that contains a Wi-Fi network authentication key, and a control module in electrical communication with and downstream from the PLC module via the at least one power line with the control module being configured to extract the power line communication from the electric current and utilize the Wi-Fi network authentication key to access the Wi-Fi network.

A method of securing a Wi-Fi network includes modulating an electric current using a PLC module to include a power line communication that contains a Wi-Fi network authentication key, conveying the electric current with the power line communication along a power line, demodulating the electric current using a control module to extract the power line communication that contains the Wi-Fi network authentication key, and utilizing the Wi-Fi network authentication key to access the Wi-Fi network.

DETAILED DESCRIPTION

A system for securing a Wi-Fi network on a vehicle is disclosed herein that utilizes a power line communication (hereinafter, "PLC") to transmit a Wi-Fi network authentication key along a power line to be extracted and utilized to connect to the Wi-Fi network. The PLC is transmitted as signal modulation (e.g., frequency or pulse) of an electric current. The electric current is modulated to include the PLC (which in turn contains the Wi-Fi network authentication key) by a PLC module in electrical communication with the power source via the power line, while the PLC containing the Wi-Fi network authentication key can be extracted by a control module in electrical communication with the PLC module via the power line. The control module utilizes the Wi-Fi network authentication key to access the Wi-Fi network to send and receive data and/or instructions from a master module and/or other components. The control module can be part of or in communication with one or a number of mechanisms, such as actuators and sensors, that perform the instructions sent to the control module by the master module and/or record data that is then transmitted via the Wi-Fi network by the control module to the master control.

Because the Wi-Fi network authentication key is only transmitted via the PLC in the electric current along the power line, only components in electrical communication with the PLC module (components along the power line downstream from the PLC module) are able to receive and extract the Wi-Fi network authentication key to gain access to the Wi-Fi network, thus providing a secure network accessible only by components on the power line (i.e., by components on the power grid). The PLC can be periodically altered to update the Wi-Fi network authentication key such that access to the Wi-Fi network is regularly changed for additional security, such as generating a new Wi-Fi authentication key periodically and requiring the control module to reestablish authentication to the Wi-Fi network at regular intervals.

The present disclosure describes the system for securing the Wi-Fi network that can be utilized on a vehicle, such as an aircraft, or within a ground-based system, such as to secure a Wi-Fi network utilized for communication between components (e.g., robots) on an assembly line (or in another configuration) or to secure communication between computers and/or mobile devices in a large system.

Figure 1A:
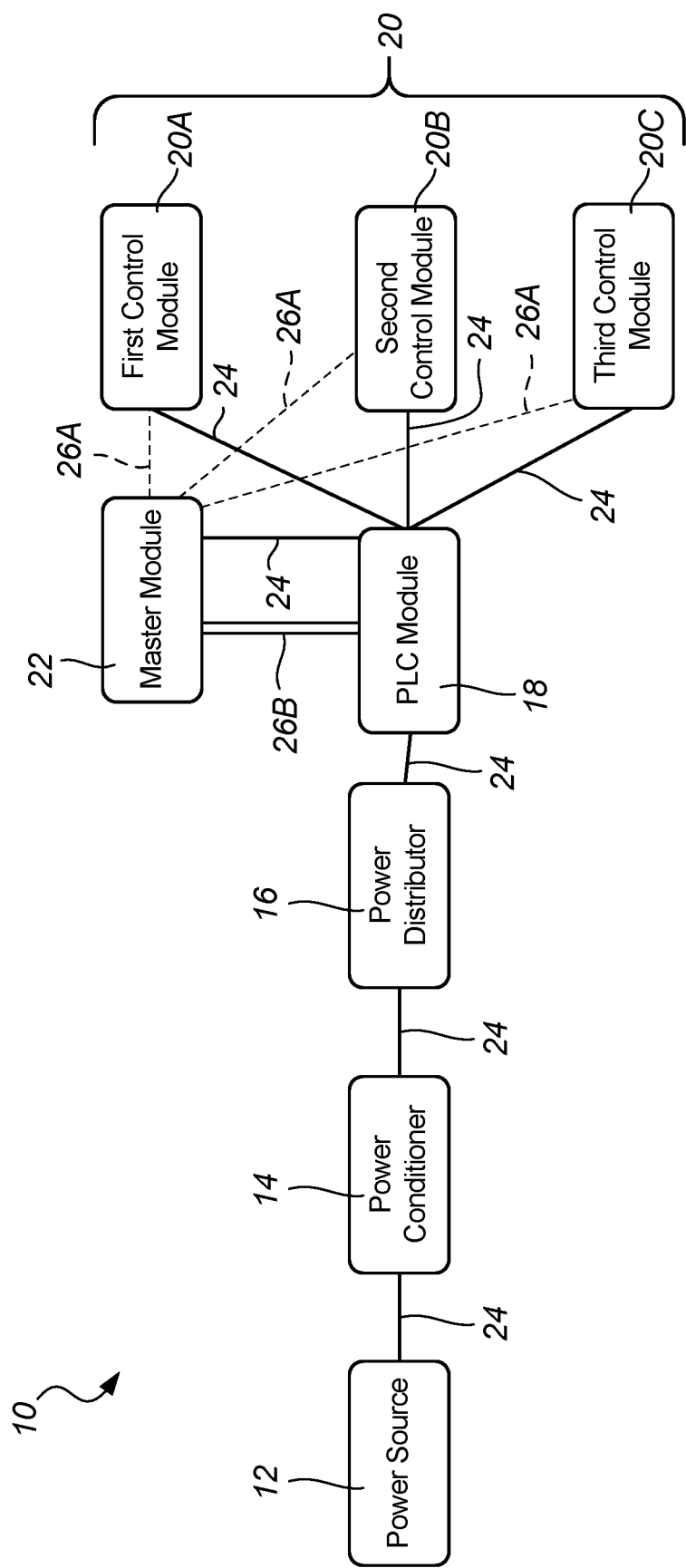
FIG. 1A is a schematic of a system using power line communication to secure a Wi-Fi network.
Figure 1B:
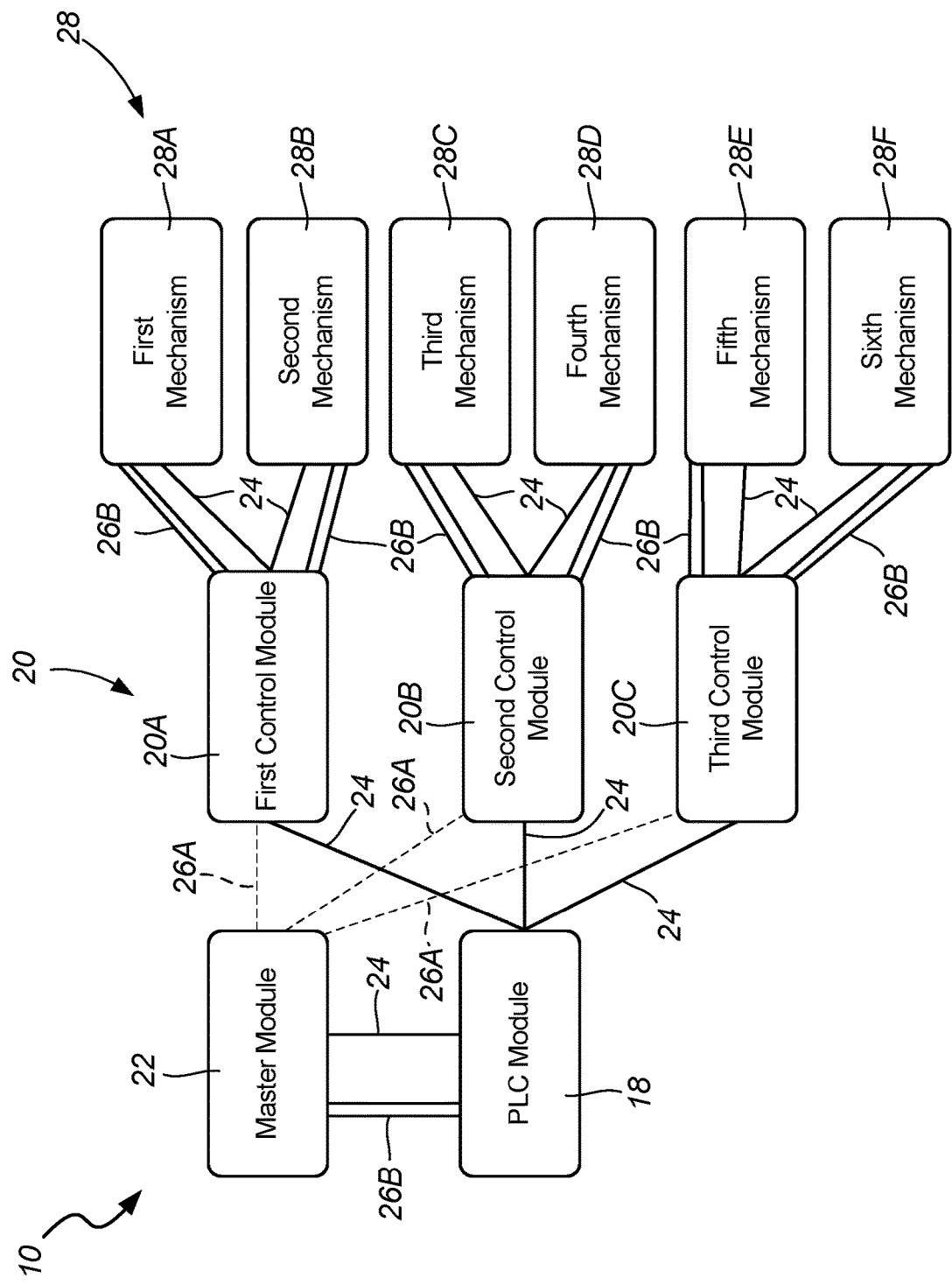
FIG. 1B is an enlarged schematic of a portion of the system showing mechanisms in communication with control modules and a mater module.

FIG. 1A is a schematic of a system using power line communication to secure a Wi-Fi network, and FIG. 1B is an enlarged schematic of a portion of the system showing mechanisms in communication with control modules. System 10 includes power source 12, power conditioner 14, power distributor 16, PLC module 18, control modules 20 (first control module 20A, second control module 20B, and third control module 20C), master module 22, power lines 24, wireless communication lines 26A, wired communication lines 26B, and mechanisms 28 (first mechanism 28A, second mechanism 28B, third mechanism 28C, fourth mechanism 28D, fifth mechanism 28E, and sixth mechanism 28F).

System 10 can be located on a vehicle, such as an aircraft, and includes various components needed to ensure the vehicle is able to function for the vehicle's intended purpose. Within system 10 is power source 12, which provides power to the components of system 10 via power lines 24. Power source 12 can be a battery, an engine, or any other type or combination of power generation and/or storage system configured to provide an electric current along power lines 24 to drive the components of system 10. Power source 12, power conditioner 14, power distributor 16, PLC module 18, and/or master module 22 can all be one component configured to perform the various tasks or multiple components in electrical communication with power source 12 (i.e., along power lines 24 as shown in the disclosed embodiment). Power lines 24 are electrical wires configured to transmit the electric current between components. Depending on the electrical needs of system 10, power lines 24 can be any type of cables/wires/lines configured to transmit any type of current, voltage, amperes, etc.

Power conditioner 14 is in electrical communication with power source 12 via power lines 24. Power conditioner 14 is configured to condition the electric current to be the necessary current (i.e., alternating or direct), voltage, etc. that are suitable for use by the other components of system 10.

Power distributor 16 is in electrical communication with power source 12 via power lines 24 downstream from power source 12. Power distributor 16 distributes/directs the electric current to the necessary components of system 10. Power distributor 16 can direct the electric current to one or multiple components of system 10, including components that do not require the Wi-Fi authentication key (or components in which access to the Wi-Fi network would not be desirable, such as electrical outlets within a passenger cabin of an aircraft). However, power distributor 16 should direct at least a portion of the electric current to PLC module 18 and then on to control modules 20 (which receive the electric current and extract the PLC containing the Wi-Fi authentication key that is added to the electric current by PLC module 18). The electric current directed to PLC module 18 and control modules 20 also provides power to drive those components.

PLC module 18 is in electrical communication with power source 12 via power lines 24 downstream from power source 12. PLC module is configured to modulate the electric current to include the PLC, which contains the Wi-Fi network authentication key, to communicate data along power lines 24. The PLC can consist entirely of the Wi-Fi network authentication key or can include other data. The PLC transmitted along the power lines 24 to control modules 20 can be any type of PLC, including narrowband or broadband PLC. Additionally, the electric current that is modulated by PLC module 18 to include the PLC can be alternating current or direct current. PLC module 18 can use a variety of modulation schemes to add the PLC to the electric current, such as Orthogonal Frequency Division Multiplexing, Binary Phase Shift Keying, Frequency Shift Keying, Spread Frequency Shift Keying, Differential Code Shift Keying, or another type of scheme. Additionally, the PLC can be configured to function at a variety of frequencies suitable to communicate the Wi-Fi authentication key along power lines 24. PLC module 18 can be in communication with master module 22 via wireless communication lines 26A or wireless communication lines 26B, with master module 22 communicating information about the Wi-Fi authentication key so that PLC module 18 can include that data in the PLC. Alternately, PLC module 18 can periodically create a different Wi-Fi authentication key that is included in the PLC and communicate that information (i.e., the Wi-Fi authentication key) to master module 22, with master module 22 utilizing the Wi-Fi authentication key to access the Wi-Fi network and communicate with control modules 20. In the disclosed embodiment, PLC module 18 and master module 22 communicate via wired communication line 26B.

Control modules 20 (first control module 20A, second control module 20B, and third control module 20C) are in electrical communication with power source 12 via power lines 24 (control modules 20 may be along the same power line 24 or different power lines 24) and are downstream from power source 12 and PLC module 18. System 10 can include any number of control modules 20, including one, two, or more than three. Control modules 20 are each configured to extract the PLC from the electric current flowing through power lines 24 and utilize the Wi-Fi network authentication key (that is contained in the PLC) to access the Wi-Fi network. After gaining access to the Wi-Fi network, control modules 20 can send and receive instructions, data, and other communications to and from other components with access to the Wi-Fi network, such as master module 22. As described below, control modules 20 are configured to receive instructions from master module 22 and convey those instructions to mechanisms 28 while also receiving data and other information from mechanisms 28 and conveying that information to master module 22. Control modules 20 can be configured to continuously demodulate the PLC to extract and utilize different Wi-Fi authentication keys that are periodically updated/created to access the Wi-Fi network to provide additional security to the Wi-Fi network.

Master module 22 is in communication with control modules 20 and PLC module 18 via wireless communication lines 26A and/or wired communication lines 26B. Master module 22 can be configured to communicate instructions and other information to control modules 20 via the Wi-Fi network. Master module 22 can be configured to communicate information about the Wi-Fi authentication key so that PLC module 18 can include that data in the PLC, which is then transmitted to control modules 20 via power lines 24. Master module 22 can also be configured to receive data and other information from control modules 22 and/or convey that information to other components in system 10, such as a display panel. PLC module 18 and master module 22 can be one component configured to perform the various tasks or two or more components distant from one another. Additionally, PLC module 18 and/or master module 22 can be part of a vehicle engine control unit (ECU), full authority digital engine/electronics control (FADEC), or another vehicle electronics unit.

Wireless communication lines 26A allow for some components of system 10 to communicate with one another without the need for wired communication lines 26B. In the disclosed embodiment, wireless communication lines 26A are the Wi-Fi network that is utilized for wireless communication and are not "lines" (i.e., wires) that transfer electric current for power and/or communication. Thus, master module 22 communicates with control modules 20 wirelessly via the Wi-Fi network.

Wired communication lines 26B allow for some components of system 10 to communicate with one another via the use of wires. Wired communication lines 26B do not require the components communicating via wired communication lines 26B to have access to the Wi-Fi network (and thus do not require the ability to receive and demodulate the PLC to obtain and utilize the Wi-Fi network authentication key). In the disclosed embodiment, PLC module 18 and master module 22 communicate with one another via wired communication lines 26B (alternately, the two components can be adjacent to one another or can be one component that is configured to perform all of the tasks of both PLC module 18 and master module 22). Further, in the disclosed embodiment, control modules 20 and mechanisms 28 communicate with one another via wired communication lines 26B (alternatively, the two components can be adjacent to one another or can be one component that is configured to perform all of the tasks of both control modules 20 and mechanisms 28).

Mechanisms 28 (first mechanism 28A, second mechanism 28B, third mechanism 28C, fourth mechanism 28D, fifth mechanism 28E, and sixth mechanism 28F) are in electrical communication with power source 12 via power lines 24 and are in communication with at least one of first control module 20A, second control module 20B, and third control module 20C. Mechanisms 28 are in communication with control modules 20 via wired communication lines 26B. Mechanisms 28 can be along power lines 24 that include the PLC or, because mechanisms 28 do not communicate with other components via the Wi-Fi network (but rather use control modules 20 to communicate via the Wi-Fi network), mechanisms 28 can be along different power lines 24 that do not first extend through PLC module 18.

Mechanisms 28 can be various actuators, sensors, or other moving or nonmoving devices of the vehicle that can be configured to perform a function depending on the instructions sent by master module 22 to control modules 20 and conveyed to that particular mechanism 28 via wired communication lines 26B. Mechanisms 28 can also be configured to collect data/information and convey that information to control modules 20, which in turn relays that information to master module 22 or another component of system 10 via the Wi-Fi network (such as another control module 20 that then conveys the information to another mechanism 28, such as a display panel). If system 10 is located on is an aircraft, mechanisms 28 can be any avionics equipment configured to control the aircraft and/or monitor the functionality of the components on the aircraft. While each mechanism 28 is shown as communicating with one control module 20, system 10 can have a configuration in which one mechanism 28 is in communication with multiple control modules 20. Additionally, while control module 20 is shown as being in communication with two mechanisms 28, control module 20 can be in communication with only one or more than two mechanisms 28.

As discussed above, the Wi-Fi network is secured by first modulating the electric current by the PLC module 18 to include the PLC that contains the Wi-Fi authentication key. The electric current with the PLC is then conveyed along power lines 24 to control modules 20. Control modules 20 demodulate the electric current to extract the PLC that contains the Wi-Fi network authentication key. Once control modules 20 have the Wi-Fi network authentication key, control modules 20 utilize that Wi-Fi network authentication key to access the Wi-Fi network to send and receive information from other components with access to the Wi-Fi network. For example, master module 22 can communicate instructions to control modules 20 via the Wi-Fi network, causing mechanisms 28 to perform a task depending on the instruction communicated to control modules 20 (which convey those instructions to mechanisms 28). Additionally, data that is collected by mechanisms 28 and/or control modules 20 can be transmitted to master control 22 via the Wi-Fi network. To provide additional security, the Wi-Fi network authentication key can be periodically changed. First, the electric current is remodulated to change the PLC to contain a different Wi-Fi network authentication key. Then, the electric current with the PLC is conveyed along power lines 24 to control modules 20. After that, control modules 20 demodulate the electric current to extract the PLC that contains the new Wi-Fi network authentication key. Finally, control modules 20 utilize the new Wi-Fi network authentication key to access the Wi-Fi network. When periodically updating the Wi-Fi network authentication key, the new Wi-Fi network authentication key should be known by master module 22 so that master module 22 can identify the components that are using the new Wi-Fi network authentication key to access the Wi-Fi network and grant that access.

The use of the Wi-Fi network to communicate between control modules 20 and the other components of system 10, including master module 22, eliminates the need for wired communication lines 26B to extend between all of the components of system 10. The use of the Wi-Fi network is made possible by requiring control modules 20 to first utilize the Wi-Fi network authentication key before gaining access to the Wi-Fi network. To ensure that only components within the system are able to get and utilize the Wi-Fi network authentication key, the electric current flowing along power lines 24 is used to transmit the PLC that contains the Wi-Fi network authentication key. Thus, only components along power lines 24 are able to gain access to the Wi-Fi network. Utilizing PLC to transmit the Wi-Fi network authentication key along power lines 24 of system 10 provides heightened security to the Wi-Fi network and limits the risk of cyber-attacks, making the use of a Wi-Fi network to communicate information between components within the system more desirable.

Discussion of Possible Embodiments

The following are non-exclusive descriptions of possible embodiments of the present invention.

A system for securing a Wi-Fi network includes a power source that transmits an electric current along at least one power line, a power line communication (PLC) module in electrical communication with the power source via the at least one power line with the PLC module being configured to modulate the electric current to include a power line communication that contains a Wi-Fi network authentication key, and a control module in electrical communication with and downstream from the PLC module via the at least one power line with the control module being configured to extract the power line communication from the electric current and utilize the Wi-Fi network authentication key to access the Wi-Fi network.

The system of the preceding paragraph can optionally include, additionally and/or alternatively, any one or more of the following features, configurations, steps, and/or additional components:

A master module in communication with the PLC with the master module being configured to communicate the Wi-Fi network authentication key to the PLC module.

A master module in communication with the control module with the master module being configured to communicate instructions to the control module via the Wi-Fi network.

A first mechanism in communication with the control module, wherein the control module instructs the first mechanism to perform a function depending on the instructions from the master module.

The first mechanism is an actuator and the control module instructs the first mechanism to actuate when instructed by the master module.

The first mechanism is connected to the control module by a wired communication line.

The first mechanism is in electrical communication with and downstream from the control module via the at least one power line.

The control module is adjacent to the first mechanism.

A second mechanism in communication with the control module, wherein the control module instructs the second mechanism to perform a function depending on the instructions from the master module.

The system is located on a vehicle.

The control module transmits data to the master module via the Wi-Fi network.

The PLC module is configured to modulate the electric current to periodically alter the power line communication to contain a different Wi-Fi network authentication key and the control module is configured to utilize the different Wi-Fi network authentication key to access the Wi-Fi network.

The power line communication is updated to contain the different network authentication key at least once every 10 minutes.

Extracting the power line communication from the electric current includes demodulating the electric current to separate the power line communication containing the Wi-Fi network authentication key from the electric current.

A method of securing a Wi-Fi network includes modulating an electric current using a PLC module to include a power line communication that contains a Wi-Fi network authentication key, conveying the electric current with the power line communication along a power line, demodulating the electric current using a control module to extract the power line communication that contains the Wi-Fi network authentication key, and utilizing the Wi-Fi network authentication key to access the Wi-Fi network.

The method of the preceding paragraph can optionally include, additionally and/or alternatively, any one or more of the following features, configurations, steps, and/or additional components:

Communicating instructions to the control module via the Wi-Fi network.

Performing a task by a first mechanism in communication with the control module depending on the instruction communicated to the control module.

The first mechanism is an actuator.

Transmitting data to a master control via the Wi-Fi network.

After utilizing the Wi-Fi network authentication key to access the Wi-Fi network, periodically remodulating the electric current to contain a different Wi-Fi network authentication key, conveying the electric current with the power line communication that contains the different Wi-Fi network authentication key along the power line, demodulating the electric current to extract the power line communication with the different Wi-Fi network authentication key, and utilizing the different Wi-Fi network authentication key to access the Wi-Fi network.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for securing a Wi-Fi network, the system comprising:
   a power source that transmits an electric current along at least one power line;
   a power line communication (PLC) module in electrical communication with the power source via the at least one power line, the PLC module configured to modulate the electric current to include a power line communication that contains a Wi-Fi network authentication key; and
   a control module in electrical communication with and electrically downstream from the PLC module via the at least one power line, the control module configured to extract the power line communication from the electric current and utilize the Wi-Fi network authentication key to access the Wi-Fi network,
   wherein extracting the power line communication from the electric current includes demodulating the electric current to separate the power line communication containing the Wi-Fi network authentication key from the electric current.

2. The system of claim 1, further comprising:
   a master module in communication with the PLC, the master module configured to communicate the Wi-Fi network authentication key to the PLC module.

3. The system of claim 1, further comprising:
   a master module in communication with the control module, the master module configured to communicate instructions to the control module via the Wi-Fi network.

4. The system of claim 3, further comprising:
   a first mechanism in communication with the control module,
   wherein the control module instructs the first mechanism to perform a function depending on the instructions from the master module.

5. The system of claim 4, wherein the first mechanism is an actuator and the control module instructs the first mechanism to actuate when instructed by the master module.

6. The system of claim 4, wherein the first mechanism is connected to the control module by a wired communication line.

7. The system of claim 4, wherein the first mechanism is in electrical communication with and downstream from the control module via the at least one power line.

8. The system of claim 4, wherein the control module is adjacent to the first mechanism.

9. The system of claim 4, further comprising:
   a second mechanism in communication with the control module,
   wherein the control module instructs the second mechanism to perform a function depending on the instructions from the master module.

10. The system of claim 4, wherein the system is located on a vehicle.

11. The system of claim 3, wherein the control module transmits data to the master module via the Wi-Fi network.

12. The system of claim 1, wherein the PLC module is configured to modulate the electric current to periodically alter the power line communication to contain a different Wi-Fi network authentication key and the control module is configured to utilize the different Wi-Fi network authentication key to access the Wi-Fi network.

13. The system of claim 12, wherein the power line communication is updated to contain the different network authentication key at least once every 10 minutes.

14. A method of securing a Wi-Fi network comprising:
   modulating an electric current using a PLC module to include a power line communication that contains a Wi-Fi network authentication key;
   conveying the electric current with the power line communication along a power line;
   demodulating the electric current using a control module to extract the power line communication that contains the Wi-Fi network authentication key; and
   utilizing the Wi-Fi network authentication key to access the Wi-Fi network.

15. The method of claim 14, further comprising:
   communicating instructions to the control module via the Wi-Fi network.

16. The method of claim 15, further comprising:
performing a task by a first mechanism in communication with the control module depending on the instruction communicated to the control module.

17. The method of claim 16, wherein the first mechanism is an actuator.

18. The method of claim 14, further comprising:
transmitting data to a master control via the Wi-Fi network.

19. The method of claim 14, further comprising:
after utilizing the Wi-Fi network authentication key to access the Wi-Fi network, periodically remodulating the electric current to contain a different Wi-Fi network authentication key;
conveying the electric current with the power line communication that contains the different Wi-Fi network authentication key along the power line;
demodulating the electric current to extract the power line communication with the different Wi-Fi network authentication key; and
utilizing the different Wi-Fi network authentication key to access the Wi-Fi network.

\* \* \* \* \*